Patented Aug. 30, 1927.

1,640,775

UNITED STATES PATENT OFFICE.

EINAR KEIDING, OF BIRKEROD, AND JOHANNES KEIDING, OF CHARLOTTENLUND, DENMARK.

PRODUCTION OF COMPLEX AUROTHIOSULPHATE COMPOUNDS.

No Drawing. Application filed May 3, 1926, Serial No. 106,545, and in Denmark November 7, 1925.

It is known that certain gold compounds have a considerable toxic effect on microorganisms so that, when introduced into the human or animal organism, they will be able to kill bacteria or check the growth of the latter and thus bring about the curability of the infectious diseases produced by the micro-organisms. In this respect reference is made to the fact that it has lately been proved that sodiumaurothiosulphate possesses a curative effect on tubercular diseases in animals and in human beings.

The present invention relates to a process of producing sodiumaurothiosulphate and analogous compounds, viz, a production of complex aurothiosulphate compounds of the alkaline metals, the alkaline earths or ammonium. The process according to the invention is such as to be readily carried out and adapted for producing large quantities of the compound in question in such a pure state that it can be used for injecting into the human or animal organism.

The essential features of the process consist in this that auroiodide or aurobromide is dissolved in an excess of the iodide or bromide of the metal or the like which is, in addition to gold, to form a compound of the final product, the solution thus produced and which is produced in a partly alcoholic liquid being subsequently brought into reaction with thiosulphate of the said metal or the like so that the reaction will take place in a partly alcoholic liquid.

In carrying out the process and in accordance with the above statement pure auroiodide or aurobromide is dissolved in iodide or bromide, respectively, of one of the alkaline metals or of the alkaline earths or ammonium, the solution being produced in a partly alcoholic liquid. To the solution thus formed there is added the calculated quantity of thiosulphate of the metal or ammonium in question. The complex compound produced by the reaction is precipitated by the addition of alcohol.

*Example.*—The reaction taking place by the production of sodiumaurothiosulphate is as follows:

$$AuBr + 2Na_2S_2O_3 = NaBr + Na_3Au(S_2O_3)_2,$$

and it may be produced in the following manner:

27.7 g. aurobromide is dissolved in a 50% alcoholic solution of 140 g. sodiumbromide. To the solution thus produced there is added 49.6 g. sodiumthiosulphate ($Na_2S_2O_3.5H_2O$). When the mixture has been kept at rest for about two hours at a temperature of about 45° C., a sufficient quantity of alcohol is added for completely precipitating the complex salt produced. The salt is filtered and crystallized in distilled wated in a quantity the weight of which is, for example, twice that of the salt.

We claim:

1. Process of producing complex auro-thio-sulphate compounds, which comprises reacting on an auro-halide with the thio-sulphate of an alkali forming metal in a solution containing some alcohol and precipitating the salt from the solution with alcohol.

2. Process of producing complex auro-thio-sulphate compounds, which comprises reacting on an auro-halide with the thio-sulphate of an alkali-forming metal in the presence of a halide whose base corresponds to the base of the thio-sulphate in a solution containing some alcohol, and precipitating the complex auro-thio-sulphate by alcohol.

3. Process of producing complex auro-thio-sulphate, which comprises reacting on auro-iodide with sodium thio-sulphate in a solution of about fifty per cent alcohol in the presence of sodium iodide in excess, and precipitating the complex auro-thio-sulphate with alcohol.

In testimony that we claim the foregoing as our invention we have signed our names.

EINAR KEIDING.
JOHANNES KEIDING.